United States Patent Office 3,329,703
Patented July 4, 1967

3,329,703
PROCESS FOR PREPARING 2,6-DICHLORO-
BENZONITRILE
Lenze Hartstra, Franciscus J. F. van der Plas, Marinus J. Waale, and Theodoor A. Weber, Amsterdam, Netherlands, assignors to Shell Oil Company, New York, N.Y., a corporation of Delaware
No Drawing. Filed Jan. 17, 1964, Ser. No. 338,320
Claims priority, application Netherlands, Jan. 22, 1963, 288,046
11 Claims. (Cl. 260—465)

This invention relates to a process for the manufacture of 2,6-dichlorobenzonitrile.

2,6-dichlorobenzonitrile is a very useful herbicide, and further, is readily converted to 2,6-dichlorothiobenzamide, which is another very useful herbicide of different properties. Therefore, it is desirable that there be available at least one process for the preparation of this nitrile efficiently on a large scale.

According to this invention, such a process has now been discovered, for it has been found that a readily available starting material, 2-nitro-6-chlorotoluene, is efficiently converted to 2,6-dichlorobenzonitrile by reaction with a nitrogen oxide chloride in the presence of a tertiary amine, optionally a chlorinating agent also being present. This process also has been found to effectively convert 2,6-dichlorotoluene and 2,6-dinitrotoluene, other available starting materials, to the nitrile. Further, it has been found that in the case of nitro-substituted toluenes by controlling the reaction temperature including a controlled amount of chlorinating agent, the nitrile can be formed without affecting the nitro group, or the nitro group can be replaced by chlorine.

The suitable nitrogen oxide chlorides include nitrosyl chloride, NOCl, or nitryl chloride, $NO_2Cl$. Instead of the nitrogen oxide chloride one can use a mixture of a nitrogen oxide and a chlorinating agent. A very suitable mixture is one of free chlorine with a nitrogen oxide in which the atomic ratio between oxygen and nitrogen is not less than 1 and not more than 2, in other words, an oxide of the formula $NO$, $N_2O_3$, $NO_2$ and $N_2O_4$ or mixtures thereof. Also mixtures of a nitrogen oxide chloride with a nitrogen oxide and/or a chlorinating agent such as chlorine can in some cases be used to advantage.

While other nitrogen oxide halides (such as those wherein the Cl is replaced by Br, F or I) can be used, in general the chloride is preferred, since this minimizes side reactions in which the different halogen is substituted on the phenyl ring. This would be especially true in cases where the nitro group is present and the reaction conditions are such as to promote replacement of the nitro by halogen. Generally, nitrosyl chloride is to be preferred. Very good results are also obtained with mixtures of chlorine and NO, or chlorine and $NO_2$. Although the most suitable ratio of the components in these mixtures may vary within wide limits, depending on the starting material and the reaction conditions, the application of excess of the nitrogen oxide has usually proven to be an advantage. Very suitable, for instance, is a mixture of NO and $Cl_2$ in a molar ratio of 1.5–2.5:1. In special cases the molar ratio may be 5:1 and higher, but seldom will it be necessary to exceed a molar ratio of 10:1.

The chlorinating agent preferably is free chlorine. Chlorinating agents that under the conditions of the reaction give off chlorine, such as sulfuryl chloride and phosphorus pentachloride are also suitable. If so desired, the chlorine, or some of it, can also be allowed to be formed in situ, for instance from HCl or from a mixture of HCl and $HNO_3$. In the latter case nitrosyl chloride is also formed in situ. Other halogenating agents are, among others, thionyl chloride, tertiary butyl hypochlorite, N-chlorourea and like chlorinating agents containing positive chlorine.

The conversion of a methyl group into a nitrile group requires at least the equivalent amount of the nitrogen oxide, either as such or in the form of a nitrogen oxide chloride. It has generally proved advantageous to apply an excess. Very good results are obtained if the toluene compound is allowed to react with an amount of nitrogen oxide, in the form of its chloride or as a mixture with a chlorinating agent, corresponding with 2 to 6 mole per mole, and in particular 3 to 5 mole per mole. If there are one or more nitro groups substituted on the aromatic nucleus, which are split off under the reaction conditions chosen, the amount of N-oxide(s) supplied from outside may be smaller, because the nitro group(s) split off or consecutive products thereof participate analogously in the reaction.

The N-oxide chloride, or the mixture containing N-oxide(s), is preferably applied in the gaseous form, the toluene compound being in the liquid form, for instance in the molten state or as a solution. If desired, however, the two reaction components can also be caused to react together either in the gas phase or in the liquid phase. The gaseous N-oxide chloride, or the mixture containing N-oxide(s), is generally passed for some 8 to 20 hours through the dissolved or molten starting product, which also contains a tertiary amine. In some cases, however, shorter or longer reaction times may also be advantageous. The feed rate is preferably equivalent to 0.2 to 0.7 mole of N-oxide per 1 mole of starting product per hour, and in particular to 0.3 to 0.5 mole per mole per hour.

An essential requirement in the new process according to the invention is the admixture of a tertiary amine to the reaction mixture. The choice of a suitable amine is in the first place determined by its stability under the conditions to be applied in the reaction. Naturally, amines that are apt to decompose to a high degree under the conditions prevailing in the reaction are useless. On the other hand, the conversion of the amine into a derivative thereof during the reaction is as a rule not harmful, as, for instance, the replacement of a nitro group by halogen or the conversion of a methyl group into a nitrile group of an aromatic or heteroaromatic amine, or the formation of a salt, an addition compound or a quaternary nitrogen base.

Heterocyclic amines have proved very satisfactory. This is true particularly of those that contain one or more C=N groups in a ring. Particularly suitable are heteroaromatic nitrogen bases. Suitable materials are therefore such compounds as N-methyl pyrrole, thiazole, N-methyl imidazole, indole and derivatives thereof. Preferably, a heterocyclic amine containing a pyridine nucleus in the molecule is used, such as pyridine and derivatives thereof, especially its homologs, in particular the picolines, lutidines and collidine.

Fused ring pyridine derivatives, such as quinoline and derivatives thereof, are also suitable. Excellent results were obtained with pyridine and beta-picoline.

The tertiary amine can be applied in catalytic quantities. Generally at least 0.08 mole per mole of the toluene starting compound is necessary, while more than 0.22 mole per mole generally tends to lower the yield. Optimum yields are often obtained with 0.02–0.12 mole per mole and in particular 0.03–0.06 mole per mole. In certain cases, however, the optimum quantities of the amine may be higher or lower.

The presence of a solvent is not essential, but may often be an advantage. Suitable solvents are, for instance, aromatic hydrocarbons, such as benzene, chlorinated and fluorinated hydrocarbons, such as 1,2-dichloroethane, o-dichlorobenzene and more highly chlorinated benzene derivatives. Notably, o-dichlorobenzene and 1,2,4-trichloro-

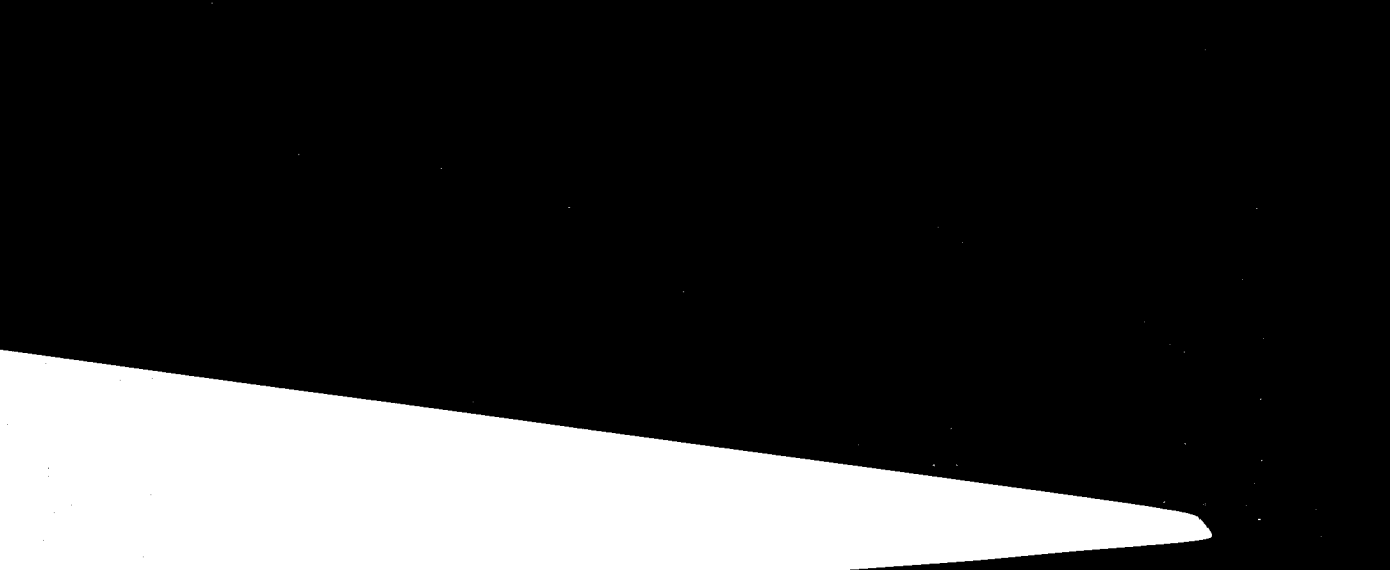

per hour. The yield of 2,6-dichloro-benzonitrile (DCBN) after 15 hours amounted to 34% of the theory.

*Example V*

The reaction conditions were as described in Example I, with the difference that a mixture of $NO_2$ and HCl (1:2 molar) was used. The feed rate was 0.2 mole $NO_2$ and 0.4 mole HCl per mole 6-chloro-2-nitrotoluene per hour. The yield of 2,6-dichloro-benzonitrile after 22 hours was 54% of the theory.

*Example VI*

The reaction conditions were as described in Example I, with the difference that 2,6-dichloro-benzylchloride (DCBY) was reacted with 0.2 mole $NO_2$ and 0.4 mole HCl per mole 2,6-dichloro-benzylchloride per hour. The yield of 2,6-dichloro-benzonitrile after 11 hours amounts to 56% of the theory. The 2,6-dichloro-benzylchloride conversion was 70%.

We claim as our invention:

1. A process for preparing 2,6-dichlorobenzonitrile which comprises reacting 2,6-dichlorotoluene, 6-chloro-2-nitrotoluene, or 2,6-dinitrotoluene at a temperature within the range of from about 120° C. to about 240° C. with nitrosyl or nitryl chloride in the presence of a catalytic quantity of a heterocyclic nitrogen base.

2. A process according to claim 1 wherein the nitrogen base is pyridine.

3. A process according to claim 2 wherein a chlorinating agent is included in the reaction mixture.

4. A process according to claim 3 wherein the chlorinating agent is elemental chlorine.

5. A process for preparing 2,6-dichlorobenzonitrile which comprises reacting 6-chloro-2-nitrotoluene with NOCl at a temperature within the range of about 120° C. to about 240° C. in the presence of a catalytic quantity of a heterocyclic nitrogen base.

6. A process according to claim 5 wherein the nitrogen base is pyridine.

7. A process for preparing 2,6-dichlorobenzonitrile which comprises reacting 6-chloro-2-nitrotoluene with NOCl and $Cl_2$ at a temperature within the range of from about 120° C. to about 240° C. in the presence of a catalytic quantity of a heterocyclic nitrogen base.

8. A process according to claim 7 wherein the nitrogen base is pyridine.

9. A process for preparing 2,6-dichlorobenzonitrile which comprises reacting, in the presence of a catalytic quantity of a heterocyclic nitrogen base and at a temperature within the range of from about 120° C. to about 240° C., 2,6-dichlorotoluene, 6-chloro-2-nitrotoluene, a chlorinating agent and a nitrogen oxide in which ene or 2,6-toluene, a chlorinating agent and a nitrogen oxide in which the nitrogen/oxygen atomic ratio is 1 to 2.

10. The process according to claim 9 wherein the nitrogen base is pyridine, the chlorinating agent is elemental chlorine and the nitrogen oxide is nitric oxide or nitrogen dioxide.

11. The process according to claim 9 wherein the nitrogen base is pyridine, the chlorinating agent is hydrogen chloride and the nitrogen oxide is nitric oxide or nitrogen dioxide.

No references cited.

CHARLES B. PARKER, *Primary Examiner.*

JOSEPH P. BRUST, *Examiner.*

DOLPH H. TORRENCE, *Assistant Examiner.*